April 18, 1950   J. L. CLARKE   2,504,804
ELECTRICAL PROTECTIVE APPARATUS
Filed Dec. 11, 1948
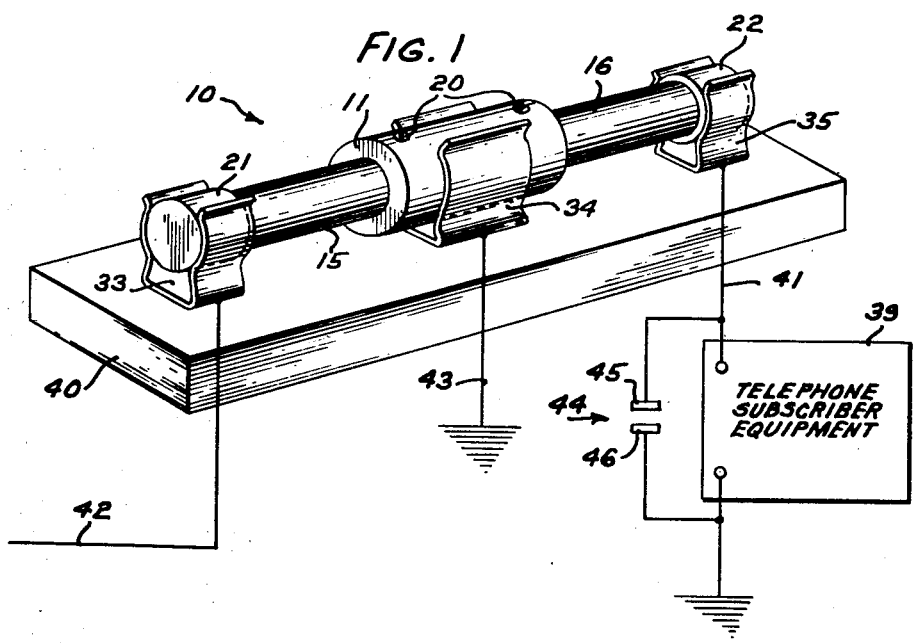
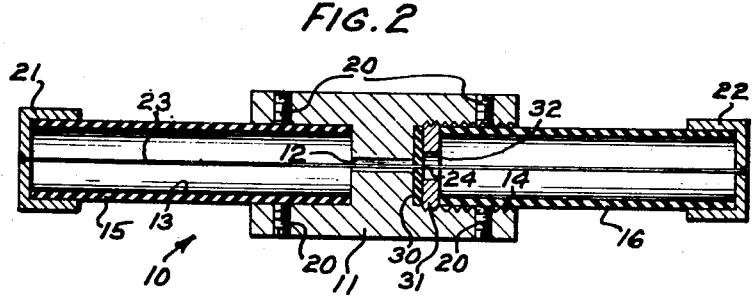
INVENTOR
J. L. CLARKE
BY E. F. Kane
ATTORNEY Patented Apr. 18, 1950

2,504,804

UNITED STATES PATENT OFFICE 2,504,804

ELECTRICAL PROTECTIVE APPARATUS

John L. Clarke, Lachine, Quebec, Canada, assignor, by mesne assignments, to Northern Electric Company, Limited, Montreal, Quebec, Canada, a corporation of Canada Application December 11, 1948, Serial No. 64,774

2 Claims. (Cl. 200—115)

This invention relates to electrical protective apparatus and more particularly to an apparatus for protecting communications equipment from damage due to high voltage contact with a communications line.

Outside communications lines are often in close proximity to high voltage power transmission lines, and when there is an accidental sustained contact of a high voltage line with a communications line due to a fallen power line, a blown fuse may not give full protection to communications apparatus because an arc may be drawn between the fuse terminals and maintain an abnormal current flow through sensitive equipment until the power line burns through the communications line upon which it has fallen.

An object of this invention is to provide a new and efficient apparatus for protecting electrical equipment from damage due to abnormal voltages.

In accordance with one embodiment of this invention, a protective device is provided with a section of straight fuse wire connected to and stretched between a pair of terminals, and a grounded electrode encircling the fuse wire but insulated therefrom. The terminals of the fuse wire are connected in series with an exposed outside line and the equipment to be protected. Any accidental high voltage will melt and rupture the fuse wire, and any resulting arc between the fuse terminals will be diverted to ground through the grounded electrode thus protecting the equipment connected to the fuse terminals.

A complete understanding of this invention will be had by referring to the following detailed description taken in conjunction with the accompanying drawing in which Fig. 1 is an illustration, partly diagrammatic, of one embodiment of the invention showing the protective device in a circuit combination; and Fig. 2 is a longitudinal section of the protective device illustrated in Fig. 1.

As shown in the drawing, a protective device 10 embodying features of the invention has a metal grounding electrode 11 which also serves as a supporting member for other parts of the device. Preferably the electrode 11 may be cylindrical in shape to facilitate manufacture thereof and to provide a convenient contact surface for a ground connection such as a strap or clip-type terminal. The electrode 11 has formed therethrough an axial passage 12 and also has counterbores 13 and 14 at opposite ends thereof for seating a pair of insulating tubes 15 and 16 which may be securely fixed in position by any suitable means, for example, set screws 20 threaded through the wall of the electrode 11.

At their free ends the tubes 15 and 16, which extend beyond the ends of the electrode 11, are provided with fixed metal terminal caps 21 and 22 which provide supporting means and terminal facilities for a length of fuse wire 23 stretched between and soldered to the caps 21 and 22. The fuse wire 23, which may be designed to melt at 10 amperes, passes through the passage 12 and a relatively small aperture 24 in the center of an annular insulating washer 30 held in place by an apertured externally threaded annular member 31 screwed within the internally threaded bore 14. The aperture 24 is smaller in diameter than the passage 12 and is just large enough to accommodate the fuse wire which is supported at that point by the wall of the aperture 24, thereby to maintain an air gap, for example, about .008", between the walls of the passage and the fuse wire. A relatively large central aperture 32 in the member 31 permits the passage of the fuse wire therethrough.

Circuit connections to the protective device 10 may be made in any suitable manner, for example, through clips 33, 34 and 35 (Fig. 1) mounted on an insulating base 40, the clips 33 and 35 being the fuse connections and the clip 34 the ground connection for the electrode 11.

In operation, the apparatus to be protected, for example, telephone subscriber equipment 39, may be connected to the fuse terminal 22 by a conductor 41 (Fig. 1), the other terminals 21 of the fuse being connected to a line subject to high voltage hazard, for instance, an outside communications line 42. A conductor 43 connects the electrode 11 to ground, which may be a water pipe ground common to the telephone equipment. Low voltage protection may be provided by a form of open-spaced cutout 44 customarily used in the protection of telephone equipment. Such a cutout may comprise two carbon blocks 45 and 46 having an accurately gauged separation of a few thousandths of an inch, one of which is connected to ground and the other to the line requiring protection. As illustrated in Fig. 1, the cutout 44 is connected to ground and to the conductor 41 in order to protect the telephone equipment 39.

In case a high voltage power line falls on the line 42, the cutout 44 will momentarily arc over, after which the fuse wire 23 will melt and part, and if an arc results between the fuse ends or terminals, it will be instantaneously diverted from the terminal 22 to the grounded electrode 11 and thence to ground through the conductor 43, which is large enough to carry the current until the fallen power line burns through the line 42.

The circuit is also operative to protect against high voltage without the cutout 44. Where such a cutout is not provided, the action of the apparatus in case of high voltage contact is the same as hereinbefore described, except that the initial momentary arc across the cutout does not take place. Use of the cutout affords low voltage protection and an added grace period in case of high voltage contact.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An electrical protective device comprising a grounded block of conducting material having a relatively large bore in either end connected by a relatively small bore, an insulating tube in each relatively large bore extending a substantial distance from said block, a terminal fixed to the outer end of each tube, a fuse wire extending from one terminal to the other through said tubes and bores, and an insulating spacer in one of said relatively large bores for supporting said fuse wire substantially concentric in said relatively small bore.

2. A unitary replaceable protective device comprising a pair of insulating tubes in axial alignment, terminal caps on the outer ends of said tubes, a centrally located grounded block of conducting material having relatively large bores in opposed ends in which the inner ends of said tubes are secured, a relatively small bore interconnecting said large bores, a fuse wire extending between said terminal caps and passing through said tubes and bores, and an insulating spacer for supporting said fuse wire substantially concentric in said relatively small bore.

JOHN L. CLARKE.

REFERENCES CITED

The following references are of record in the file of this patent:

UNITED STATES PATENTS

| Number | Name | Date |
|---|---|---|
| 440,361 | McManman | Nov. 11, 1890 |
| 640,744 | Chinn | Jan. 9, 1900 |
| 662,466 | Sachs | Nov. 27, 1900 |
| 745,114 | Nicholas | Nov. 24, 1903 |
| 758,954 | Bell | May 3, 1904 |
| 2,049,552 | Walsh | Aug. 4, 1936 |